United States Patent [19]

Anwyll et al.

[11] Patent Number: 4,869,544
[45] Date of Patent: Sep. 26, 1989

[54] SLIDING DOORS

[75] Inventors: Joseph Anwyll; Colin G. Edmondson; David J. Marsh, all of Cheshire, England

[73] Assignee: Motor Panels (Wigan) Limited, Wigan, England

[21] Appl. No.: 248,403

[22] Filed: Sep. 23, 1988

[30] Foreign Application Priority Data

Sep. 25, 1987 [GB] United Kingdom ............... 8722551

[51] Int. Cl.$^4$ .............................................. B60J 5/04
[52] U.S. Cl. .................................... 296/155; 49/209; 49/213; 49/214; 49/215; 49/218; 49/221
[58] Field of Search ................ 296/155; 49/209, 213, 49/214, 215, 216, 218, 221

[56] References Cited

U.S. PATENT DOCUMENTS

| | | | |
|---|---|---|---|
| 4,157,846 | 6/1979 | Whitcroft | 296/155 |
| 4,413,444 | 11/1983 | Chikaraishi | 296/155 |
| 4,544,198 | 10/1985 | Ochirai et al. | 296/155 |
| 4,615,558 | 10/1986 | Nakamura | 296/155 |

Primary Examiner—Robert R. Song
Attorney, Agent, or Firm—Spensley Horn Jubas & Lubitz

[57] ABSTRACT

The apparatus enables a door to be moved into, out of and across an opening in a structure. A motor vehicle has upper, lower and intermediate guides 1, 7, 12 by which a door 6 is suspended and guided for movement by way of guide members 5', 8, 15 engaged with the guides. Curves 1', 7' at the front of guides 1, 7 guide the door into the opening. A door plate 14 and arm 16 constitute a hinge and the arm 12 is pivoted to the intermediate guide member 15. When the door is in the opening the arm 16 prevents downward pivoting of a carrier 19 on the intermediate guide member 15 whereby a roller 21 on the carrier is engaged with an abutment end 22 of the intermediate guide 12, preventing the intermediate guide member 15 engaged with it from sliding rearwardly along that guide 12. Initially, during opening, the curves of the upper and lower guides 1, 7 and the hinge 14, 16 cause movement of the door laterally out of the opening and to the rear. When the arm 16 clears the carrier 19 the latter can pivot down to allow the door to slide rearwardly. During closing, the carrier 19 prevents a forward pivoting of the arm 16 until the roller 21 rises to engage the abutment end 22, positioning and freeing the door for movement into the opening. The door is latched in open and closed positions.

18 Claims, 6 Drawing Sheets

SLIDING DOORS

This invention is concerned with sliding closure members for openings, particularly sliding doors for vehicles.

Operators require sliding doors on road vehicles used for delivery purposes, such as vans, for ease of entry and exit. Sliding doors are also used in certain railway carriages, for example on the underground system, for the same reason. Where vans are concerned a sliding door conversion is made of a basic vehicle fitted with hinged doors. A specially built door of relatively light construction is used and is mounted on rails for fore and aft sliding movement. Because this door is mounted, and moves, externally of the vehicle it has to be narrow to avoid increasing excessively the width of the vehicle. It is difficult to seal when in the closed position and fitting involves bodywork changes to the basic vehicle. Sliding windows only can be fitted because the narrow door will not accommodate the mechanism for wind up/down windows. The conversion is relatively expensive. In the case of railway carriages these are purpose built with sliding doors which are accommodated within the carriage. In consequence, at each set of doors there is a break in the continuity of the sides of the carriage causing an increase in aerodynamic drag losses.

According to one aspect of the present invention there is provided apparatus for enabling a closure member to be moved across and into and out of closing engagement with an opening in a structure, comprising:

first and second elongate guides which fit to the structure in a parallel spaced relationship to straddle the opening and continue in one direction beyond the opening;

a third elongate guide which fits to the structure beyond the opening between and in a parallel spaced relationship to said first and second guides;

first, second and third guide members which mount on the closure member and co-operate with respective ones of said guides for movement therealong whereby to support the closure member on and guide it in movement along said guides crosswise of the opening;

curved portions on said first and second guides along which said respective first and second guide members are movable to cause an adjacent end of the closure member to be directed into the opening transversely of the direction of crosswise movement of the closure member;

a hinge having relatively pivotable first and second arms of which said first arm connects to an opposite end of the closure member, and said second arm carries said third guide member and is pivotal relative thereto between closed and open positions, and interlock means having parts carried by said third guide and said third guide member which co-operate and with one of which said parts said second hinge arm co-operates to hold said parts in co-operation to prevent movement of said third guide member in a direction along said third guide away from the opening when said second hinge arm is in said closed position, which it is arranged to occupy when the closure member is in the opening, and which said parts are released by pivotal movement of said second hinge arm towards said open position, being related to opening movement of the closure member out of the opening and releasing said second hinge arm from co-operation with said one part.

A first stop may be provided on the third guide member and a first abutment on the third guide so that engagement of the first stop with the first abutment locates the closure member for an unobstructed entry into the opening.

The apparatus may include second interlock means to prevent a return pivoting movement of said second hinge arm unless the third guide member is at an end of the third guide which in use of the apparatus is adjacent to the opening to allow the closure member to have an unobstructed passage to enter the opening.

The apparatus may include at least one docking member for mounting on the closure member at said adjacent end and a corresponding docking means adapted to be fitted to the structure whereby the docking member and docking means co-operate to locate said adjacent end in the opening. The co-operating docking member and docking means may also serve to restrain the closure member from movement laterally out of the opening.

According to another aspect of the present invention there is provided a vehicle comprising a structure having an opening therein, a door for closing said opening, and apparatus for enabling said door to be moved across and into and out of closing engagement with said opening, said apparatus comprising:

first and second elongate guides fixed to said structure in a parallel spaced relationship straddling said opening and continuing in one direction beyond said opening;

a third elongate guide fixed to said structure beyond said opening between and in a parallel spaced relationship to said first and second guides;

first, second and third guide members mounted on said door and co-operating with respective ones of said guides for movement therealong and whereby said door is supported on and guided in movement along said guides crosswise of said opening;

curved portions on said first and second guides along which said respective first and second guide members are movable to cause an adjacent end of said door to be directed into said opening transversely of the direction of crosswise movement of said door;

a hinge having relatively pivotable first and second arms of which said first arm is connected to an opposite end of said door, and said second arm carries said third guide member and is pivotal relative thereto between closed and open positions, and interlock means having parts carried by said third guide and said third guide member which co-operate and with one of which said parts said second hinge arm co-operates to hold said parts in co-operation to prevent movement of said third guide member in a direction along said third guide away from said opening when said second hinge arm is in said closed position, which it occupies when said door is in said opening, and which said parts are released by pivotal movement of said second hinge arm towards said open position when said door is drawn out of said opening, said pivotal movement releasing said second hinge arm from co-operation with said one part.

The third guide and third guide member may comprise a sliding pair including an elongate guide, a guide member slidable along the guide, a carrier member pivotally connected to the guide member, a stop carried by the carrier member, an abutment on the guide, first biasing means acting between the carrier member and the third guide member to cause the stop to engage the abutment, an arm pivotally connected to the third guide member and abutment means on the arm arranged so as to prevent pivotal movement of the carrier member until the arm has been pivoted to a predetermined position relative to the third guide member whereupon the carrier member is freed to pivot, allowing the stop to move across the abutment and so permitting the third guide member to be moved along the guide.

An embodiment of the invention will now be described by way of example with reference to the accompanying drawings in which.

Figure 1:
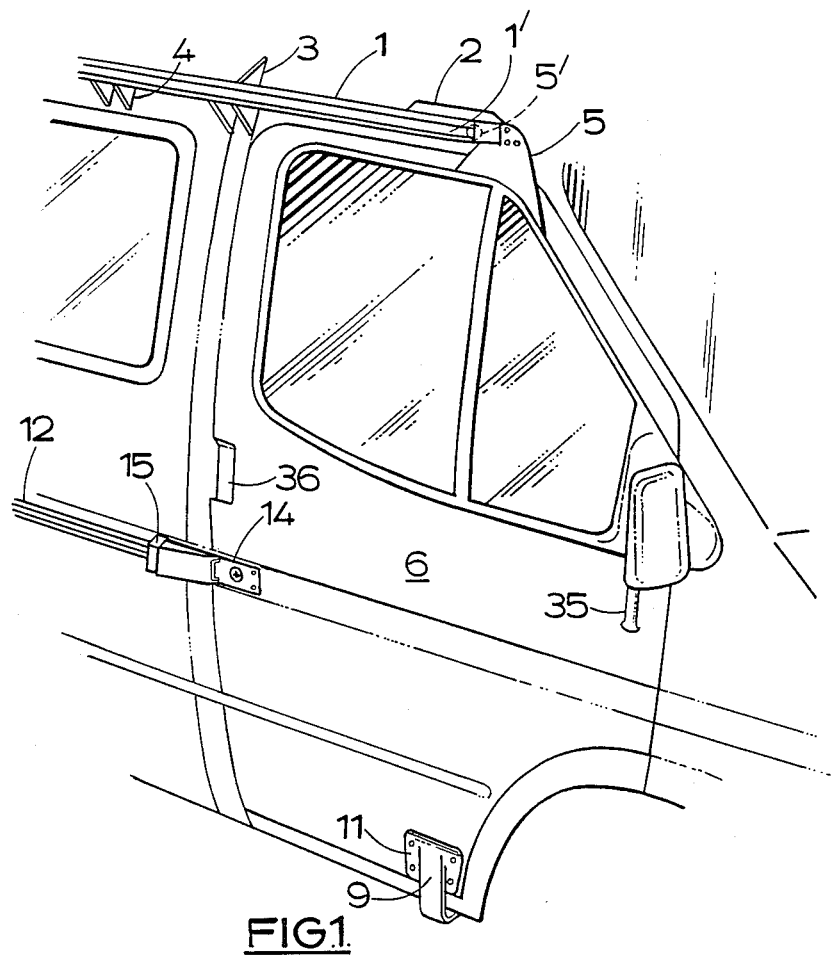
FIG. 1 is a scrap side view of a vehicle having a door which is shown in a closed position.
Figure 2:
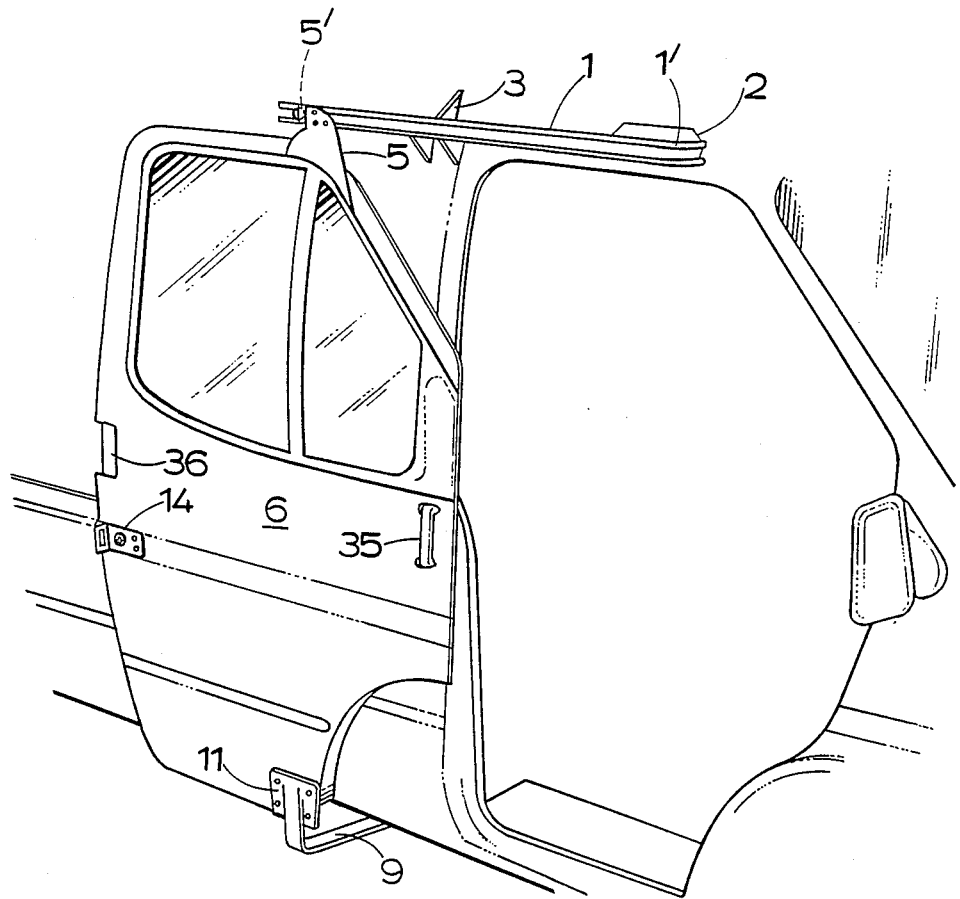
FIG. 2 is similar to FIG. 1 but shows the door in an open position.

Referring to FIGS. 1 and 2 of the drawings, there is shown part of one side of a conventional van which has been made with a standard door secured to the van body by upper and lower hinges adjacent the front edge of the door. In accordance with our invention this door is converted from pivotal opening and closing movement to sliding opening and closing movement.

For the conversion the original door hinges are removed and the mirror is transferred from the door to the 'A' post of the van body at the front of the door opening. A first, upper, elongate guide 1, for example of channel section, which has an inwardly curved front end portion 1', is secured to the van body by brackets 2, 3, 4, for example by bolting or welding. A bracket 5, secured to the top of the door 6 at the front, carries a rotatably mounted roller 5 (the first guide member) which is engaged in the guide 1 and retained by vertical lips of the guide.

Figure 3:
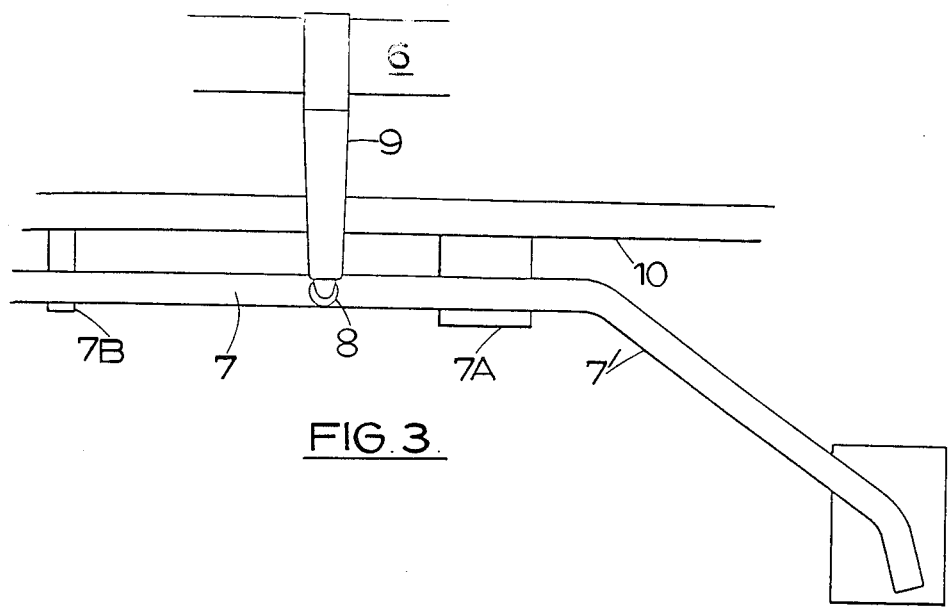
FIG. 3 is a schematic view showing a lower guide and a guide member attached to the door, viewed from below.

A second elongate guide 7, see FIG. 3, is secured by brackets to the underside of the van in parallel spaced relationship to the guide 1. As shown, two brackets 7A, 7B have been designed to locate against the inner sill 10 to facilitate fitting. The second guide 7 also has an inwardly curved front end portion 7 and is engaged by a rotatably mounted roller 8 (the second guide member) carried by an arm 9 fixed to a plate 11 which is secured to the bottom of the door 6, at the front thereof. As shown, the second guide 7 is of channel section. Alternatively it may be in the form of a blade, and the second guide member may be in the form of coupled rollers—one engaging each side of the blade. As can be seen, the first and second guides 1 and 7 straddle the opening for the door and they extend beyond the opening towards the rear of the van. A third guide 12 is secured to the side of the van body at an intermediate position between the first and second guides 1 and 7 and parallel to them. One method of attachment for the third guide 12 is by means of plates bolted to the van body side, as plate 13 in FIGS. 4 and 5. The front end of the 10 third guide 12 is just behind the 'B' post of the van body at the rear of the door opening and is conveniently aligned with the door lock, shown mounted in a plate 14 on FIG. 1.

Figure 4:
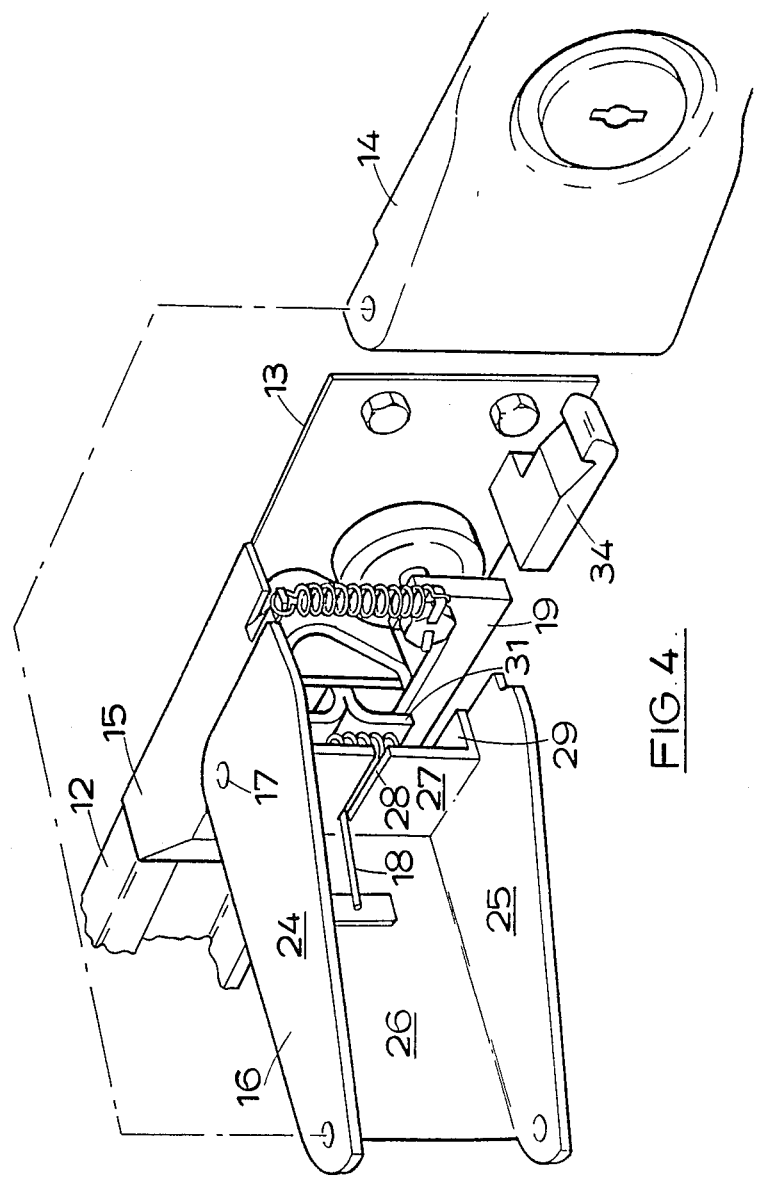
FIG. 4 is a perspective view showing a third guide and guide member with a stop freed for movement across an abutment on the guide.
Figure 5:
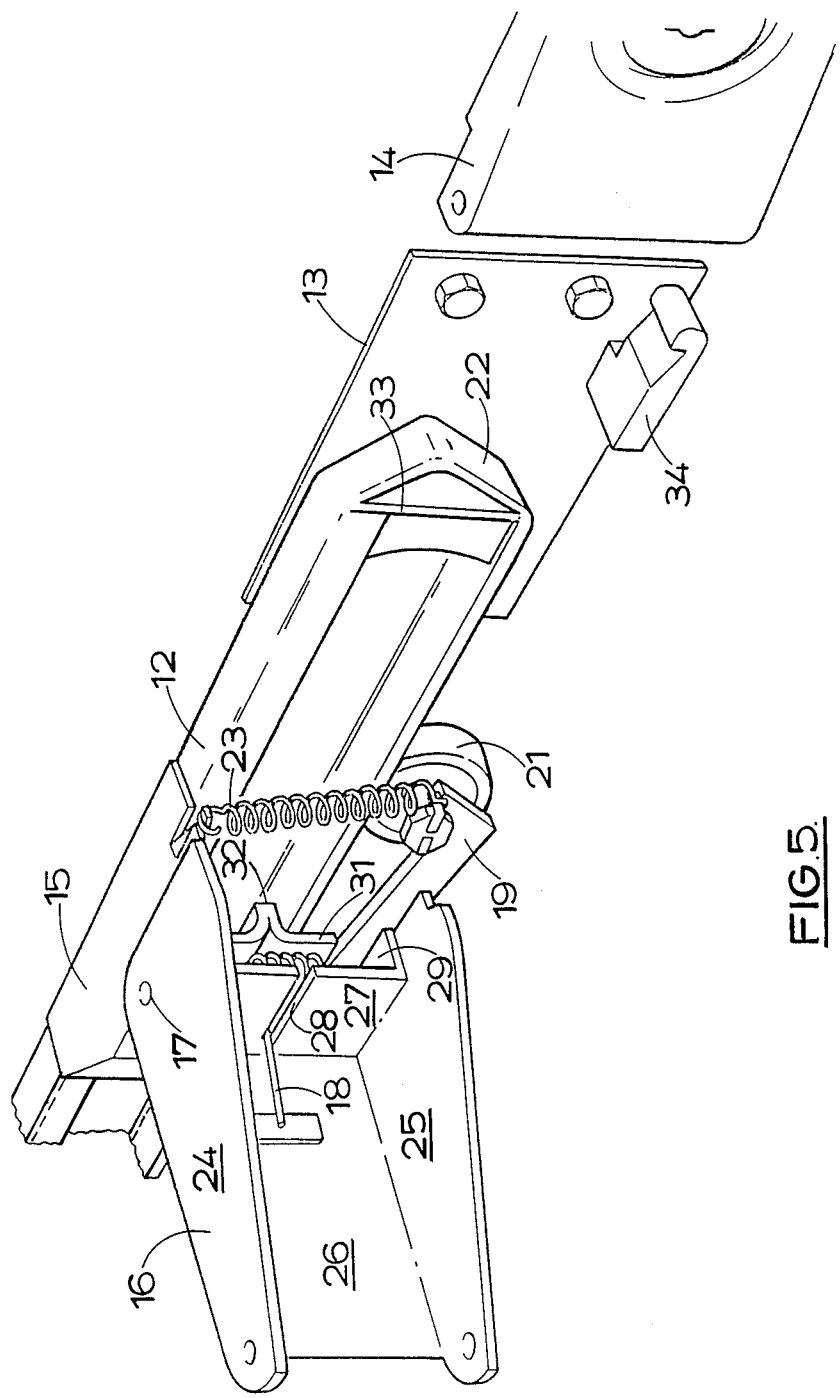
FIG. 5 is similar to FIG. 4 showing the guide member part-way along the guide.

A third guide member 15, FIGS. 4 and 5, fixed to the door near its rear edges is slidably mounted on the third guide 12. The third guide member 15 includes a depending member 31 formed with a lip 32 which is directed into the third guide 12. At its front end the third guide 12 has a vertical abutment wall 33. The maximum forward sliding movement of the door 6 is defined by engagement of lip 32 with the abutment wall 33. An interlock or sequencing mechanism (the first interlocking means) prevents movement of the third guide member 15 rearwardly from the position it takes up when the door is closed until such time as the rear of the door has been moved sufficiently out of the door opening as to allow its unobstructed movement to the rear.

An arm 16 is pivotally secured at 17 to the third guide member 15. A spring 18 biasses the arm 16 towards the position relative to the third guide member which is shown in FIGS. 4 and 5, for example at a right angle thereto. A carrier member in the form of a lever 19 has its rear end pivotally secured to the third guide member 15 and rotatably carries a roller 21 at its front end. The roller 21 constitutes a stop which can engage an abutment which, in this example, is provided by an inclined front end 22 of the third guide 12. A tension spring 23 is connected between the lever 19 and the third guide member to cause the roller 21 to ride up the inclined front end 22, as seen in FIG. 4.

The arm 16 is of generally channel-section having upper and lower surfaces 24, 25 and a side 26. These are stiffened by a channel-shaped member 27. Member 27 has a slot 28 which receives an end of the spring 18. A lower flange 29 of the member 27 passes below the lever 19 to prevent downward pivoting thereof when the arm 16 is pivoted forwardly on the third guide member 15. Referring to FIG. 5, it will be seen that when the lever 19 has pivoted downwardly it prevents forward pivoting of the arm 16. This constitutes second interlock means, the vertical edge of the lower surface 25 forming an abutment for engagement with a side face of the lever 19.

The outer end of the arm 16, as indicated in FIGS. 4 and 5, is pivotally secured to the rear of the plate 14 and that plate and the arm constitute a hinge. A latch plate 34 is mounted on the plate 13. This is engaged by a latch (not shown, but which is preferably of the usual vehicle "anti-burst" type) mounted inside the door so as, when the door is in the fully open position, to hold it in that position. The latch may be released by operation of a handle 35 at the front of the door, FIGS. 1 and 2. A further handle 36, or hand hold, provided at the rear of the door may be used to close the door.

Figure 6:
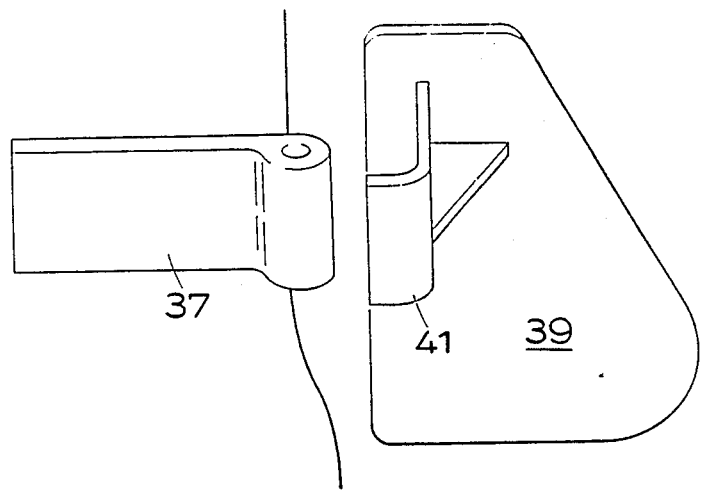
FIGS. 6 and 7 are perspective views illustrating two constructions of docking members and corresponding docking means.
Figure 7:
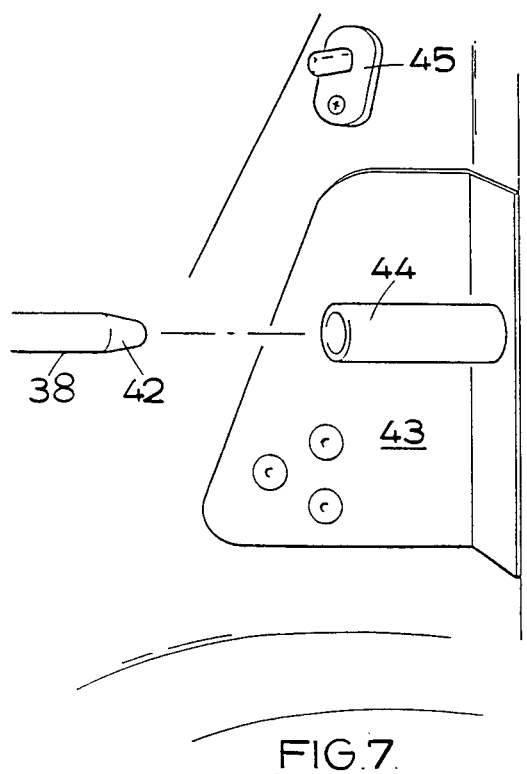

Referring now to FIGS. 6 and 7, two docking members 37, 38 are secured to the front of the door. In this example the docking member 37 is the door-mounted arm of the original upper hinge of the door. A plate 39 secured in the door opening carries a generally L-shaped bracket 41. The docking member 38 comprises a pin having a tapered end 42. A plate 43 which is secured in the door opening carries a tube 44. A door-operated switch 45 is also provided in the door opening. Preferably the plates 39 and 43 are secured in the door opening by utilisation of the existing hinge mounting holes. As the door approaches its fully closed position the docking members 37, 38 respectively engage in a bracket 41 and the tube 44, constituting docking means to locate and hold the front end of the door in its closed position.

Figure 8:
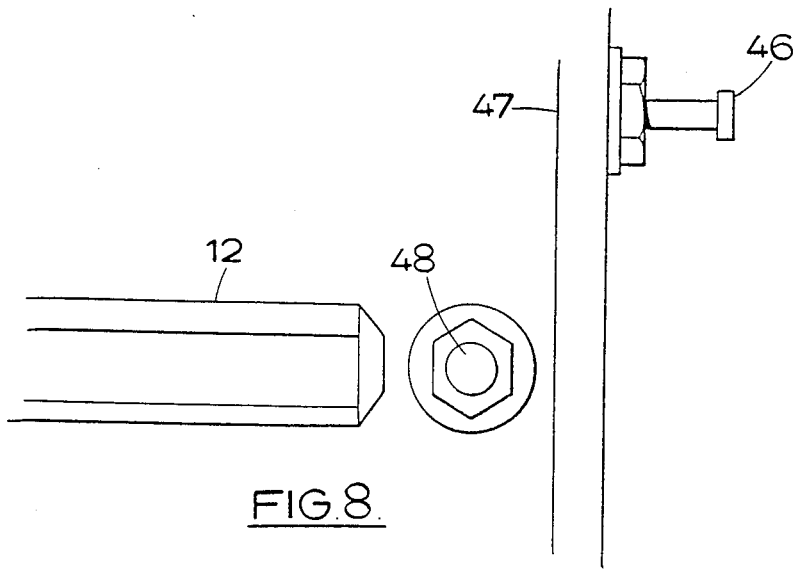
FIG. 8 is a scrap view showing a latch pin for latching the door in the open position.

Referring now to FIG. 8, the usual latch pin 46 for a vehicle door is shown secured to the 'B' post 47. The third guide 12 is shown and also a latch pin 48 at the front of the guide. This is similar to latch pin 46 and may be used instead of the latch plate 34 shown in FIGS. 4 and 5, to further commonality of parts.

The operation of the door will now be described. With the door 6 unlocked, the door handle 35 is operated to release the existing anti-burst type door latch. A rearward force applied to the handle 35 then causes rearward pivoting movement of the arm 16 which, due to its pivotal connection to the plate 14, causes the rear of the door to move out of the opening. Simultaneously, the front end of the door is undoced as docking members 37, 38 are respectively withdrawn from the bracket 41 and tube 44 and the front end of the door moves out of the opening as the first and second guide members 5', 8 move along the curved front end portions 1', 7' of the first and second guides 1, 7. When the arm 16 reaches the position shown in FIG. 4 continued rearward force on the door causes the roller 21 to ride down the inclined front end 22 of the third guide 12 because the lever 19 is now free to pivot downwardly. The door then slides rearwardly with the roller 21 running along the lower surface of the third guide 12, as seen in FIG. 5. When the door is fully open the latch on the inside of the door engages latch plate 34 and the door latches in the open position.

In order to close the door the handle 35 is operated to release the latch and a forward force is applied to cause the door 6 to slide forwards, carried and guided by the three guides 1, 7 and 12. The arm 16 cannot pivot forwardly due to its abutment with the lowered lever 19. When the door reaches a position for entry into the opening the roller 21 has reached the front end of the third guide 12 and rides up the inclined front end 22. Lip 32 engages the abutment wall 33, stopping forward movement of the third guide member 15, and the arm 16 pivots forwardly to carry the rear end of the door into the opening assisted by the momentum of the forward movement of the door when the lip 32 engages the abutment wall. At the same time the front end of the door is guided into the opening due to the curved front end portions 1', 7' of the first and second guides 1 and 7 and the docking members 37, 38 enter the bracket 41 and tube 44 respectively.

The third guide 12 and the third guide member 15, together with the arm 16 and parts carried thereby, constitute a novel sliding pair having an interlock or sequencing facility which contributes to enabling a closure member to be moved into and out of an opening in a structure adapted to receive it and for enabling the closure member to be moved across the opening.

It will be seen that this invention, in the embodiment described, allows a hinged door of a vehicle to be converted to a sliding door. This substantially preserves the original design contours of the vehicle so that aerodynamic drag is not significantly increased. The structural integrity of the vehicle is retained, and even enhanced, due to the docking feature for the front of the door. The door is properly weather sealed in the closed position as it would be if it had been retained in its original hinged form. The original window winding mechanism, being incorporated in the original door, is retained thus allowing the desirable combination of a wind up/down window with the sliding door. It is contemplated that a single bracket, or perhaps two brackets might be used to secure the first guide to the vehicle and a streamlined fairing, for example of plastics material or a steel or aluminium pressing, may be fitted over the bracket or brackets and the first guide. The invention may, of course, be used on a new vehicle designed to have a door as described herein.

It will also be appreciated that this invention can find ready application by the manufacture and sale of kits of parts to facilitate the economical conversion of existing vehicles as well as allowing a vehicle manufacturer to build sliding door versions of basic vehicles at a very economic cost.

Whilst the embodiment of the invention described relates to a horizontally sliding closure member, that is the door 6, the apparatus is also applicable to a closure member which is to be moved into, out of and across, an opening adapted to receive it in any other desired orientation, for example a vertically sliding closure member.

We claim:

1. Apparatus for enabling a closure member to be moved across and into and out of closing engagement with an opening in a structure, comprising:
    first and second elongate guides which fit to the structure in a parallel spaced relationship to straddle the opening and continue in one direction beyond the opening;
    a third elongate guide which fits to the structure beyond the opening between and in a parallel spaced relationship to said first and second guides;
    first, second and third guide members which mount on the closure member and co-operate with respective ones of said guides for movement therealong whereby to support the closure member on and guide it in movement along said guides crosswise of the opening;
    curved portions on said first and second guides along which said respective first and second guide members are movable to cause an adjacent end of the closer member to be directed into the opening transversely of the direction of crosswise movement of the closure member;
    a hinge having relatively pivotable first and second arms of which said first and connects to an opposite end of the closure member, and said second arm carries said third guide member and is pivotal relative thereto between closed and open positions, and
    interlock means having parts carried by said third guide and said third guide member which co-operate and with one of which said parts said second hinge arm co-operates to hold said parts in co-operation to prevent movement of said third guide member in a direction along said third guide away from the opening when said second hinge arm is in said closed position, which it is arranged to occupy when the closure member is in the opening, and which said parts are released by pivotal movement of said second hinge arm towards said open position, being related to opening movement of the closure member out of the opening and releasing said second hinge arm from co-operation with said one part.

2. Apparatus according to claim 1 including a stop on said third guide member and an abutment on said third guide interengageable with said stop to locate the closure member for an unobstructed closing entry into the opening.

3. Apparatus according to claim 1 in which said interlock means comprises a stop carried by said third guide member and movable between erected and retracted positions, an abutment at said third guide, means acting between said third guide member and said third guide enabling movement of said stop to said erected position to engage said abutment, and means acting between said third guide member and said second hinge arm to prevent movement of said stop from said erected position to said retracted position, released from engagement with said abutment, until said second hinge arm has been pivoted to said open position.

4. Apparatus according to claim 3 in which a carrier member is pivotally connected to said third guide member, said stop is carried by said carrier member, biasing means acts between said carrier member and said third guide member and is operative to cause said stop to move to said erected position when it reaches said abutment, and a second abutment on said second hinge arm engageable with said carrier member to prevent pivotal movement thereof until said second hinge arm has been pivoted to said open position whereupon said carrier member is freed to pivot, thereby allowing movement of said stop to said retracted position and so permitting said third guide member to move along said third guide.

5. Apparatus according to claim 1 including second interlock means carried by said third guide member being operated by said third guide to engage with said second hinge arm to prevent pivoting movement of said second hinge arm from said open position to said closed position, and being freed from engagement with said second hinge arm to allow said second hinge arm to pivot to said closed position, thereby enabling the closure member to enter the opening, when said third guide member is at one end of said third guide which in use of the apparatus is adjacent to the opening.

6. Apparatus according to claim 1 in which said interlock means comprises a carrier member pivotally connected to said third guide member, a stop carried by said carrier member pivotally movable therewith between erected and retracted positions, biassing means acting between said carrier member and said third guide member to urge said carrier member to pivot towards said erected position, an abutment at said third guide with which said stop engages in said erected position, and a second abutment on said second hinge arm engageable with said carrier member to prevent pivotal movement thereof in the direction which moves said stop to said retracted position until said second hinge arm has been pivoted to said open position, whereupon said carrier member is freed to pivot to move said stop to said retracted position and permit said third guide member to move along said third guide, and second interlock means is provided comprising a third abutment on said second hinge arm engageable with said carrier member when said stop is in said retracted position to hold said second hinge arm in said open position.

7. Apparatus according to claim 3 in which said stop is a rotary member carried by said third guide member.

8. Apparatus according to claim 6 in which said stop is a rotary member mounted on said carrier member.

9. Apparatus according to claim 2 in which said abutment comprises a surface at an end of said third guide inclined with respect to the elongation of said third guide.

10. Apparatus according to claim 6 in which said abutment comprises a surface at an end of said third guide inclined with respect to the elongation of said third guide.

11. Apparatus according to claim 1 including biasing means acting between said third guide member and said second hinge arm to urge said second hinge arm towards said open position.

12. Apparatus according to claim 1 including a docking member and docking means which respectively mount on the closure member and on the structure and co-operate to locate an end of the closure member in the opening.

13. Apparatus according to claim 1 including retention means comprising releasably engageable elements which are adapted to be mounted on the closure member and the structure and when engaged secure the closure member in the opening.

14. Apparatus according to claim 1 including latch means comprising releasably engageable elements which are adapted to be mounted on the closure member and the structure and when engaged hold the closure member in an open position along said first and second guides beyond the opening.

15. A vehicle comprising a structure having an opening therein, a door for closing said opening, and apparatus for enabling said door to be moved across and into and out of closing engagement with said opening, said apparatus comprising:
first and second elongate guides fixed to said structure in a parallel spaced relationship straddling said opening and continuing in one direction beyond said opening;
a third elongate guide fixed to said structure beyond said opening between and in a parallel spaced relationship to said first and second guides;
first, second and third guide members mounted on said door and co-operating with respective ones of said guides for movement therealong and whereby said door is supported on and guided in movement along said guides crosswise of said opening;
curved portions on said first and second guides along which said respective first and second guide members are movable to cause an adjacent end of said door to be directed into said opening transversely of the direction of crosswise movement of said door;
a hinge having relatively pivotable first and second arms of which said first arm is connected to an opposite end of said door, and said second arm carries said third guide member and is pivotal relative thereto between closed and open positions, and
interlock means having parts carried by said third guide and said third guide member which co-operate and with one of which said parts said hinge arm co-operates to hold said parts in co-operation to prevent movement of said third guide member in a direction along said third guide away from said opening when said second hinge arm is in said closed position, which it occupies when said door is in said opening, and which said parts are released by pivotal movement of said second hinge arm towards said open position when said door is drawn out of said opening, said pivotal movement releasing said second hinge arm from co-operation with said one part.

16. A method of converting a hinged door of a vehicle for sliding movement into and out of closing engagement with an opening in a body of said vehicle, using apparatus as claimed in claim 1 comprising the steps of:
removing the hinges of said door;
fixing said first and second elongate guides to said body in a parallel spaced relationship straddling said opening and extending beyond said opening at one side thereof, and such that said curved end portions extend inwardly towards said body adjacent an opposite side of said opening;

fixing said third elongate guide to said body beyond said opening between and in a parallel spaced relationship to said first and second guides;

mounting said first and second guide members on said door;

mounting said third guide member on said door by connecting said second hinge arm to one end of said door, and engaging said first, second and third guide members respectively with said first, second and third guides to support said door thereon for guided movement there along crosswise of said opening with an end of said door opposite said one end towards said curved end portions, whereby said opposite end is caused to be directed into said opening by engagement of said first and second guide members with said curved end portions.

17. A method according to claim 16 including the further steps of mounting an interengageable docking member and docking means respectively on said door at said opposite end and on said body at said opening for co-operation when said opposite end has been entered into said opening to locate said opposite end in said opening.

18. A method according to claim 17 in which said docking member is constituted by an arm of one of said removed hinges.

* * * * *